Feb. 23, 1932.    P. OSTENBERG    1,846,903
ELECTRIC MOTOR SUPPORT
Filed April 7, 1928
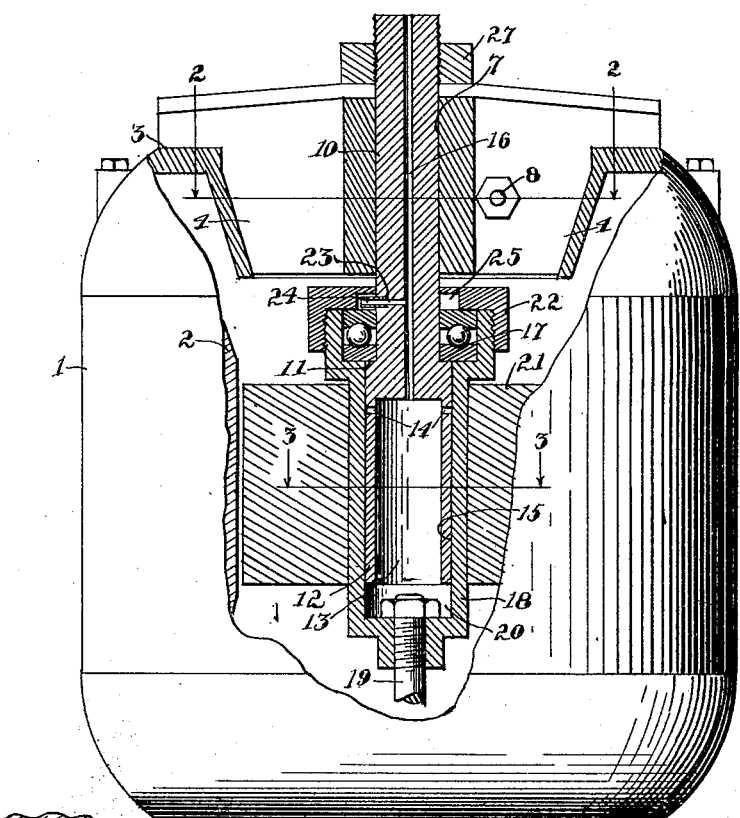
FIGURE 1
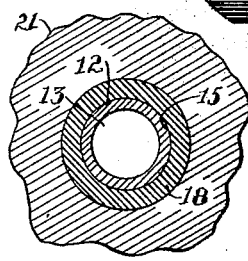
FIGURE 3
FIGURE 2
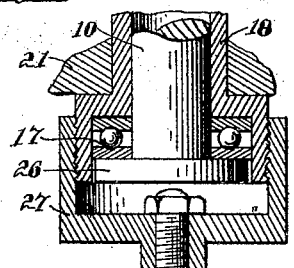
FIGURE 4
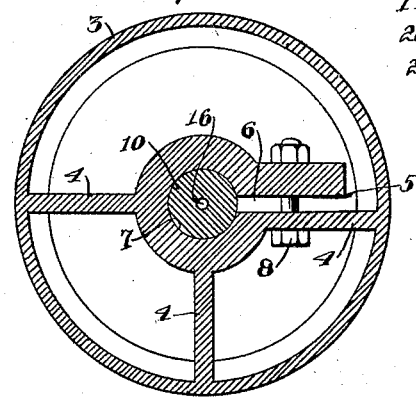
INVENTOR
Pontus Ostenberg
John A. Raismith
ATTORNEY Patented Feb. 23, 1932

1,846,903

UNITED STATES PATENT OFFICE

PONTUS OSTENBERG, OF SAN JOSE, CALIFORNIA

ELECTRIC MOTOR SUPPORT

Application filed April 7, 1928. Serial No. 268,161.

This invention relates particularly to that type of motor in which the rotor rotates about a vertical axis, and especially wherein the rotor shaft supports a load as in a vertical centrifugal pump.

It is the object of the invention to provide a motor of the character indicated wherein the rotor is so mounted that it will run true throughout the life of the motor.

It is also an object of the invention to provide a motor of the character indicated that will be simple in construction, of few parts, economical to manufacture and operate, strong and durable, and highly efficient in its practical application.

In the drawings:

Figure 1 is a side elevation of a portion of a motor embodying my invention, part broken away.

Figure 2 is a section on 2—2 Figure 1.

Figure 3 is a section on 3—3, Figure 1.

Figure 4 is a detail illustration of another embodiment of the invention.

Referring now more particularly to the drawings, I show a motor at 1 with its stator 2 concentrically arranged relative to a vertical axis.

In effecting my invention I provide a top element 3 to be mounted on the motor 1 in fixed relation thereto, and carrying webs 4 which in turn support a clamp 5. The clamp is preferably formed by providing a slot 6 in one web and extending to and communicating with the central bore 7, a bolt 8 passing through the web and slot serving as a suitable means for tightening the clamp upon the element mounted therein.

Fixedly held in the clamp described, and fitted with an adjusting nut 9, is a bearing member 10 provided with a shoulder 11 a distance below the clamp 5, the said shoulder lying in a horizontal plane and thereby providing an end portion 12 of greater diameter than that engaging the clamp. The portion 12 is hollow as at 13 throughout the major portion of its length, and is provided with small passages 14 near its upper end and communicating with the outer cylindrical bearing surface 15. A conduit 16 is formed in member 10 whereby a suitable lubricant may be introduced into the hollow portion 12. On shoulder 11 is mounted a ball-bearing 17.

At 18 is shown a sleeve or hollow shaft revolubly mounted on the bearing 12 and supporting a driven shaft at 19 at its lower end which is closed to form a chamber at 20. The rotor 21 is mounted on the shaft as an integral part thereof, and the upper end of the shaft is enlarged to encompass the bearing 17 and has a cap 22 screwed down thereon to engage the bearing 17.

At 23 is shown a small conduit connecting the conduit 16 with the exterior of member 10 and carried a distance therebeyond by means of a small pipe 24. A recess 25 is formed in the under side of the cap 22 and in which the pipe 24 rotates with member 10.

These parts are so constructed, arranged, and proportioned that when assembled as described the rotor 21 is supported in its proper position in stator 2, and instead of rotating upon the conventional two bearings it will rotate upon the single bearing surface 15. One distinct advantage of this construction is that the tendency of the bearing to wear unevenly due to the connection of the driven shaft 19 is entirely eliminated, and the number of parts required in the construction is reduced to a minimum.

This construction affords easy and perfect lubrication because the rotating parts will cause a circulation of the oil through the hollow portion 13 and chamber 20, then upwardly between the hollow shaft and part 12 and then through orifices 14 back to chamber 20. Since the upper portion of the shaft is enlarged the centrifugal force generated by the revolving shaft carries oil through the bearing 17 and then through the conduits 24 and 16 and back to chamber 20.

In the embodiments shown in Figure 4 the bearing 17 is carried by a flange 26 on the lower end of element 10, and the shaft 18, rotor 21, cap 27 and driven shaft 19 are carried by the bearing 17. Axial adjustment of member is effected by means of nut 27.

It is to be understood, of course, that while I have herein shown and described the preferred embodiments of my invention, changes in form, construction, and method of assembly and operation may be made within the scope of the appended claim.

I claim:

In combination, a head member adapted to be rigidly mounted upon an electric motor, a hub fixedly mounted in the head in axial relation thereto and provided with a cylindrical bore adapted to engage a spindle, a spindle adapted to support the motor rotor seated in the bore, a nut threaded upon the spindle to bear against the hub, the said hub being separated longitudinally and provided with means for drawing the separated parts together whereby to rigidly clamp the spindle in the hub.

PONTUS OSTENBERG.